United States Patent [19]

Brummenaes

[11] 4,137,861

[45] Feb. 6, 1979

[54] PROCESS FOR MOORING A SHIP AND A FENDER ARRANGEMENT FOR SUCH MOORING PROCESS

[76] Inventor: Irving Brummenaes, 9 Nedstrandgaten, 5500 Haugesund, Norway

[21] Appl. No.: 790,122

[22] Filed: Apr. 22, 1977

Related U.S. Application Data

[63] Continuation-in-part of Ser. No. 589,140, Jun. 23, 1975, abandoned.

[30] Foreign Application Priority Data

Jun. 26, 1974 [NO] Norway .......................... 742313/74

[51] Int. Cl.² ............................................ B63B 59/02
[52] U.S. Cl. .................................... 114/219; 114/230
[58] Field of Search .................. 114/219, 220, 230; 61/48; 267/65 R, 116

[56] References Cited

U.S. PATENT DOCUMENTS

| 2,039,151 | 4/1936 | Dubois | 114/219 |
|---|---|---|---|
| 3,613,625 | 10/1971 | Halsingborg | 114/230 |
| 3,707,934 | 1/1973 | Frankel | 114/230 |
| 3,773,007 | 11/1973 | Haisch | 114/219 |
| 3,854,706 | 12/1974 | Johnston | 267/65 R |
| 3,864,922 | 2/1975 | Dial et al. | 114/219 |
| 3,913,396 | 10/1975 | Elliot | 114/230 |

*Primary Examiner*—Trygve M. Blix
*Assistant Examiner*—Jesus D. Sotelo
*Attorney, Agent, or Firm*—William Anthony Drucker

[57] ABSTRACT

The process of mooring a ship at a ship's terminal, using fenders to damp forces transmitted from the ship to the ship terminal. As the ship is hauled towards the terminal by mooring winches the forces are simultaneously damped by a first counter pressure medium exerted by each fender. A second pressure medium is relieved when the pressure thereof exceeds the pressure of the first medium by discharging the second pressure medium to a pressure relief tank without effecting a recoil action on the fender.

6 Claims, 5 Drawing Figures

PROCESS FOR MOORING A SHIP AND A FENDER ARRANGEMENT FOR SUCH MOORING PROCESS

CROSS REFERENCE TO PENDING APPLICATION

The application is a continuation-in-part of application Ser. No. 589,140 filed June 23, 1975 in the name of Irving BRUMMENAES. The parent application Ser. No. 589,140 is abandoned except for its priority date applied to the present application.

BACKGROUND TO THE INVENTION

This invention relates to a process for mooring a ship at a ship terminal, using mutually spaced fender units to damp push forces transmitted from the ship to the ship terminal, including hauling the ship towards said terminal with hauling stresses provided by separate mooring winches.

The present invention is especially useful for mooring of very large ships, such as oil tankers of from 100,000 to 500,000 dwt.

In the past there have been some severe accidents occurring in mooring operations involving damaging of ship terminal constructions and bringing the safety of the ship, its crew and other environments out of control. To bring a ship under sufficient control during mooring processes requires sufficient access to pushing or hauling forces in each case to keep the ship in immovable condition. As long as the ship is being moved from one position to another, it will require especially great forces within a reasonable short time to stop movements of the ship caused by the dynamic forces involved by movements of the ship and/or other pushing or hauling forces. Thus, when the ship is arriving at a ship terminal, the dynamic forces from the ship are first of all being controlled by tug-boats. In addition, a number of hawsers each controlled by separate mooring winches can be used to bring the ship softly and easily into correct support against the ship terminal. However, during further mooring operations including loading and unloading operations the ship usually has to be controlled mainly or only by means of mooring winches. To secure the ship in a safe position at the ship terminal, all unintended movements of the ship causing dynamic forces in the ship should be prevented by all means as such forces usually will require far more hauling power than that which can be provided by the mooring winches. In this respect the ship is being pressed continuously via fender arrangements against a jetty or similar ship terminal construction. This hauling action will usually cause sufficient friction to avoid unintended movement of the ship in respect of the ship terminal. However, some movement of the ship will be indispensable due to movements of the ship caused by tidal forces and loading and unloading forces. Such movements have, however, to be continuously under complete control. This is a main problem in mooring operations which is usually solved by using self-tensioning automatic mooring winches.

A furhter main problem is the effect of water currents and especially changing water currents that tends to bring the ship out of contact with its fender constructions. A similar problem is also caused by winds blowing in directions from the terminal constructions towards the ship. Some of the accidents in the past are believed to be caused by such problems or a combination of such problems.

When hauling a ship towards the ship terminal and simultaneously moving the ship, the mooring winches are usually operated manually. During manual operation the mooring winch which can be operated at a speed of say 30 meters per minute when tensioning the hawser with maximum stress and at a speed of say 100 meters per minute when the hawser is in more or less unstressed condition. However, during automatic operation the hauling speed of the mooring winch is restricted to 3 to 4 meters per minute. In some cases, harbour authorities have prohibited the use of automatic self-tensioning mooring winches due to the fact that said severe mooring accidents have been blamed on the insufficiency of existing mooring winches. It is thought necessary to add that such severe mooring accidents have also happened later on in cases where automatic mooring has been prohibited and omitted.

OBJECTS OF THE INVENTION

One object of the present invention is to find a solution to the problems indicated above based on a different consideration. In this respect, the fender arrangements being used hitherto are found to be rather insufficient for their purpose.

The main object of the fender arrangements being hitherto used has been to damp all pushing forces involved by pushing or hauling the ship against the terminal construction. One main disadvantage is that such damping effect has caused simultaneously storing of rather uncontrolled energy in such damping means. It is thus a great problem when the effect of wind forces and/or water current forces is imposing the ship in such a way that said uncontrolled energy is being suddenly released.

SUMMARY OF THE INVENTION

The process of the present invention is characterized in simultaneously damping said push forces by means of a first controlled counter pressure medium exerted by each fender and relieving from said fender a second pressure exceeding the pressure of said first pressure medium by discharging said second pressure medium to a pressure relief tank, and preventing recoil to said fender of such relieved second pressure medium.

It is preferred according to the present invention to use hydraulic pressure medium in a damping means of each fender, to control said first pressure by means of a control valve, and allocating said first pressure by means of a manometer.

A fender arrangement to be used at a ship terminal to damp push forces transmitted from the ship to said ship terminal, including forces obtained by a plurality of mooring winches for hauling the ship towards the ship terminal wherein a number of mutually spaced separate fender constructions are arranged at the ship terminal at a location between the ship terminal and a ship being moored thereto, is characterised in that each fender includes one or more pressure medium controlled damping components and cooperating pressure relieving and recoil preventing means.

DESCRIPTION OF THE PREFERRED EMBODIMENT

Figure 1:
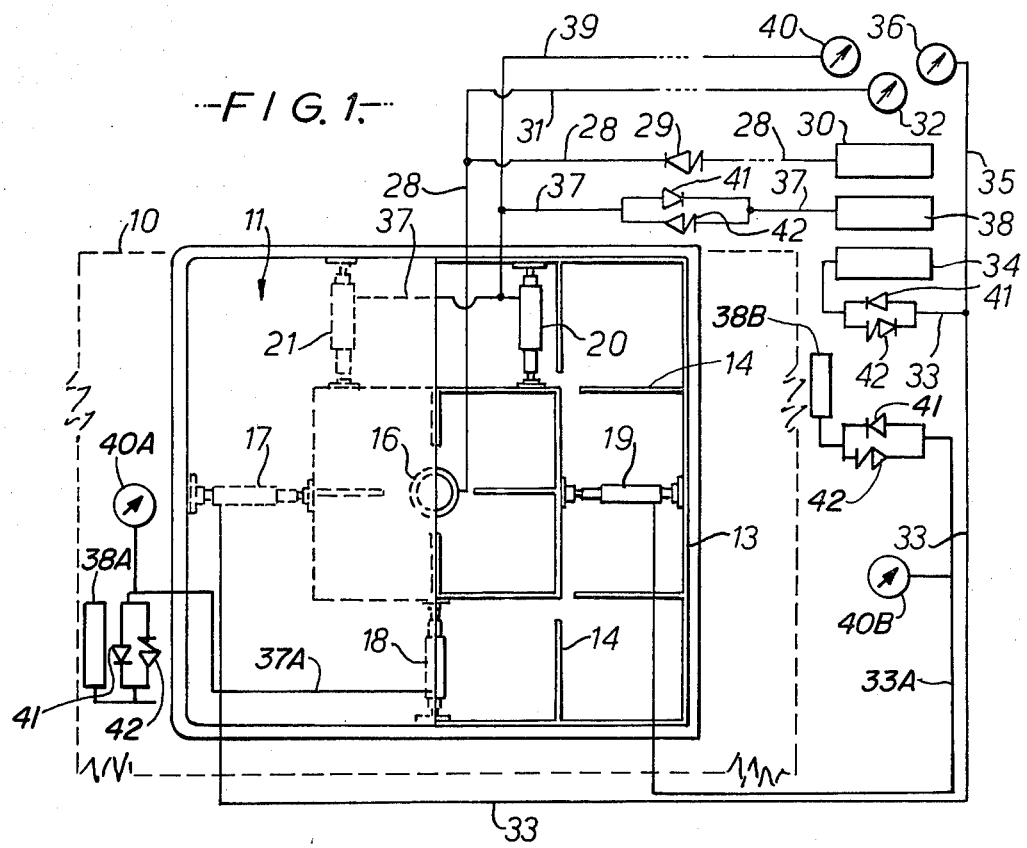
FIG. 1 is a front view of a fender construction of an arrangement according to the present invention and some parts of the fender construction are deleted herein for illustrative purposes.

In the drawings is in dotted lines illustrated part of a jetty 10 or similar ship terminal construction. A fender construction 11 is located at the top of the jetty 10 to damp pushing forces from the ship (not shown). A vertical fender base plate 12 is anchored directly to the top and side surfaces of the jetty in a manner known per se. A skirt member 13 with box-formed shape extends horizontally outwards from said fender base plate 12 and is internally supported by triangular plates 14 to form a rigid support 13, 14 against the jetty. A vertical front plate 15 with a circumferential shape corresponding substantially to that of the skirt member 13 is connected directly with the base plate 12 concentric therewith by means of a main hydraulic cylinder unit 16, whereas said front plate 15 at the circumference thereof is connected with said skirt member 13 by means of a number of auxiliary cylinder units 17, 18, 19, 20 and 21. One end of the cylinder of said main cylinder unit 16 is connected with the base plate by means of a ball and socket joint 22, whereas the opposite end of said cylinder unit, i.e., the outer end of the piston rod thereof, is connected with the front plate 15 by means of a similar ball and socket joint 23. The auxiliary cylinder units 17–21 is pivoted separately in bearings 24 at an outer edge portion of said skirt member 13 and in bearings 25 at a skirt member 26 extending inwardly from said front plate 15. However, said auxiliary cylinder unit bearings 24 and 25 can alternatively be substituted by ball and socket joints corresponding to the main cylinder unit joints 22 and 23. Said skirt member 26 is in a similar way at the skirt member 13 provided with triangular plates 27 to support said skirt member 26 in said front plate 15.

The main cylinder unit 16 communicates via a passage 28, including a biased one-way valve 29, with a pressure relief tank 30. From said passage 28 at a location between said valve 29 and said main cylinder unit 16 extends a branched-off passage 31 to a remote manometer 32. In the embodiment illustrated said one-way valve 29 opens at a pressure against the fender construction of 300 tons.

One of the auxiliary cylinder units 17–21, i.e., the horizontally extending cylinder unit 17 communicates through a passage 33 with a pressure tank 34. From said passage 33 a branched-off passage 35 extends to a remote manometer 36. In a similar manner two upper cylinder units 20, 21 communicate through a passage 37 with a common pressure tank 38, whereas a branched-off passage 39 extends from said passage 37 to a remote manometer 40. Similarly the unit 18 is connected through passage 37A to a manometer 40A and the unit 19 is connected through passage 33A to a manometer 40B.

Figure 2:
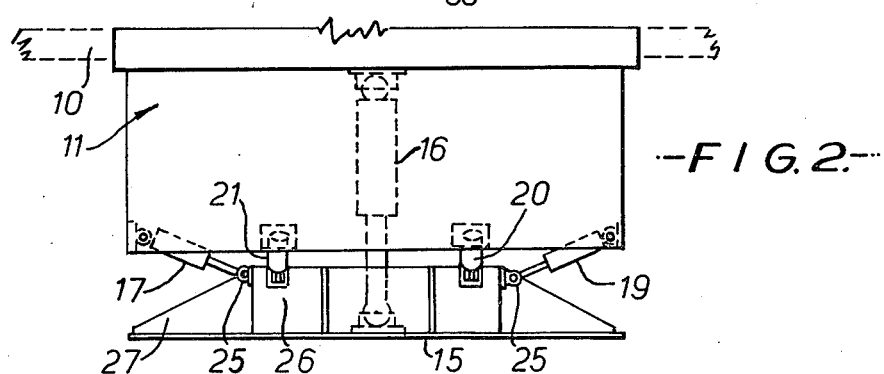
FIG. 2 is a top side view of said fender construction.

In FIG. 2 (and in dotted lines in FIG. 3) the fender construction is illustrated in its unloaded extended position. As soom as a ship is supported against the fender front plate 15, a pressure amounting to 300 tons is being built up in said fender construction controlled by the valve 29 of the main cylinder unit 16. A damping effect is provided in the main cylinder unit to damp pushing forces from the ship by compressing the cylinder unit, whereas hydraulic pressure medium escapes through the one-way valve 29 to the pressure relief tank 30. In a first part of the compression operation of the main cylinder unit 16, i.e., from the position illustrated in dotted lines to the position illustrated in full lines in FIG. 3, a simultaneous compression of the main cylinder unit and the auxiliary cylinder units is taking place. During such simultaneous compression the auxiliary cylinder units are pivoted from a mutually converging position to a position parallel with said front plate 15. In the illustrated embodiment hydraulic pressure medium is during said compression of the auxiliary cylinder units discharged directly from the auxiliary cylinder units to the respective pressure tanks 34 and 38. By means of the auxiliary cylinder units is achieved a combined damping effect and centering effect on said front plate 15. In other words, said auxiliary cylinder units cooperate with the main cylinder unit to damp the pushing forces involved by the ship and are simultaneously centering said main cylinder unit during the compression thereof to maintain said main cylinder unit in a position perpendicular to the main side of the ship.

Figure 3:
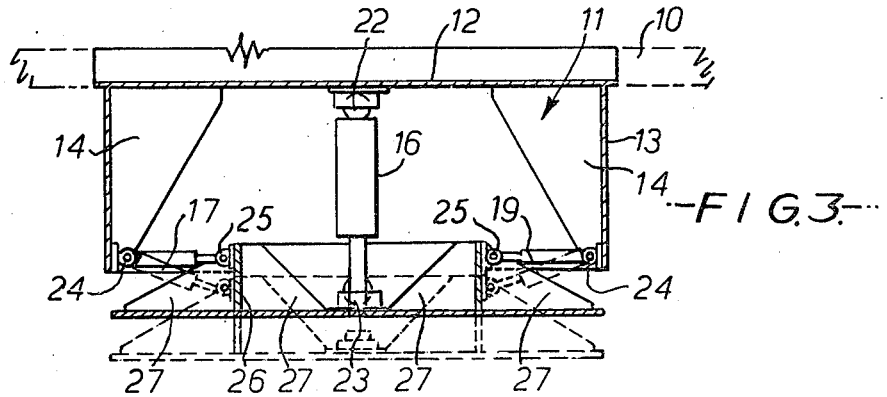
FIG. 3 is a horizontal section of said fender construction.

After having moved past a dead center line as illustrated in full lines in FIG. 3, the auxiliary cylinder units still maintain their centering effect on the main cylinder unit, but will from now on have a contrary effect on the front plate 15 to that of the main cylinder unit as the main cylinder unit is being further compressed. However, by means of a non-return valve 41 in the passage 33 (37) and a pressure relief valve 42 coupled in parallel with said non-return valve, a suction effect provided in the auxiliary units makes it possible to obtain the same effect on the front plate 15 by the main cylinder unit as well as by the auxiliary cylinder units. The front plate 15 can thus be damped as required until the front plate 15 reaches its inner end position as defined by its abutting of the skirt member 13. In this inner end position the pressure on the main cylinder unit and the auxiliary cylinder units corresponds to the pressure involved by the pushing forces from the ship. Such pressure is defined by means of the one-way valve 29 of the main cylinder unit and the non-return valve 41 and the pressure relief valve of the auxiliary cylinder units. However, as soon as the pushing forces from the ship are reduced, the hydraulic pressure in the main cylinder unit is allowed to drop below the opening pressure of the one-way valve 29, and no recoil effect will occur. In addition, the suction effect obtained in the auxiliary cylinder units due to the movement thereof from the dead center line towards the position corresponding to the inner end position of the front plate, ends as soon as the front plate reaches its inner end position. In this end position the auxiliary cylinder units are released to contract as required without involving any recoil effect on the fender construction.

When the ship is brought to its final position against the jetty, the hawsers of the mooring winches will be loaded as required, and a static pressure will be involved accordingly on the front plate 15. In all events, however, this static pressure will be lower than the corresponding opening pressure of the one-way valve 29 of the main cylinder unit 16, and as soon as such static pressure is released from the front plate 15, there will be no recoil effect in the main cylinder unit or in the auxiliary cylinder units.

It is to be noted that the static pressure on the front plate 13 is such that in case of vertical or lengthwise movement of the ship in respect of the ship terminal such movement is in general prevented due to a corresponding friction effect occurring between the ship and the front plate. However, in case pushing forces from the ship lengthwise or vertical of the ship surpass the friction forces involved by such movement, a controlled movement of the ship will be possible. The manometer 32 indicates the pressure of the ship normal to the length of the ship to the operator controlling the ship's hawsers so that by controlling the hawsers he can control the pushing forces from the ship, whereas the manometers 40 and 36 enable him to control the forces involving movement of the ship lengthwise or vertically respectively. The actual friction occurring between the ship and the fender construction will in each case be evident from reading of the manometers. Stresses exerted in the mooring hawsers can be regulated in relation thereto, as required.

It is evident that the use of more elaborated control equipment will be possible within the scope of the present invention. Thus, instead of using one manometer for two or three cooperating auxiliary cylinder units it will be possible to use one manometer for each cylinder unit to enable the operator to effect continuous control of the pressure involved in each unit.

It will also be possible to use more sophisticated equipment for regulating the pressure in each cylinder unit. It will also be evident that the valves involved can be regulated by remote control means as required. For instance, when the ship is leaving the terminal upon a finished loading or unloading operation, it will be possible to regulate the valves to reset the fender construction in its original expanded position as illustrated in FIG. 2. In this respect, it will also be possible to use further resetting means including hydraulic pumps etc.

Other modification of the fender construction will also be possible. Instead of using one main cylinder unit and a number of auxiliary cylinder units to center said main cylinder unit there can be used three or more main cylinder units arranged at a distance from and converging towards the center line through the front and base plates. Such group of three or more main cylinder units can make the auxiliary cylinder units more or less superfluous as such main cylinder units can exert a mutual centering effect and simultaneously make a damping effect upon compression. The compression characteristics involved by such group of cylinder units can be different from that of the group of cylinder units shown in the illustrated embodiment of the present invention. It is evident that each of such main cylinder units can be controlled separately in the same manner as that of the main cylinder unit of FIGS. 1 to 3.

The arrangement of fender constructions controlled by hydraulic pressure medium can also be used for purposes in addition to those described above. In order to avoid accidents or dangerous conditions to occur in mooring operations, it will be advantageous to use the pressure provided in each manometer controlled passage by a method obvious to one skilled in the art as a control medium for automatic stopping of loading and unloading operations and also for automatic disengagement of loading and unloading equipments. It will also be advantageous that such control medium is being used to exert a warning signal as soon as the push forces from the ship against the ship terminal are dropping below a security level so that necessary further action in the mooring operation can be made as required.

A number of mutually spaced separate fender constructions may be arranged at the ship terminal at a location between the ship terminal and a ship being moored thereto.

Figure 4:
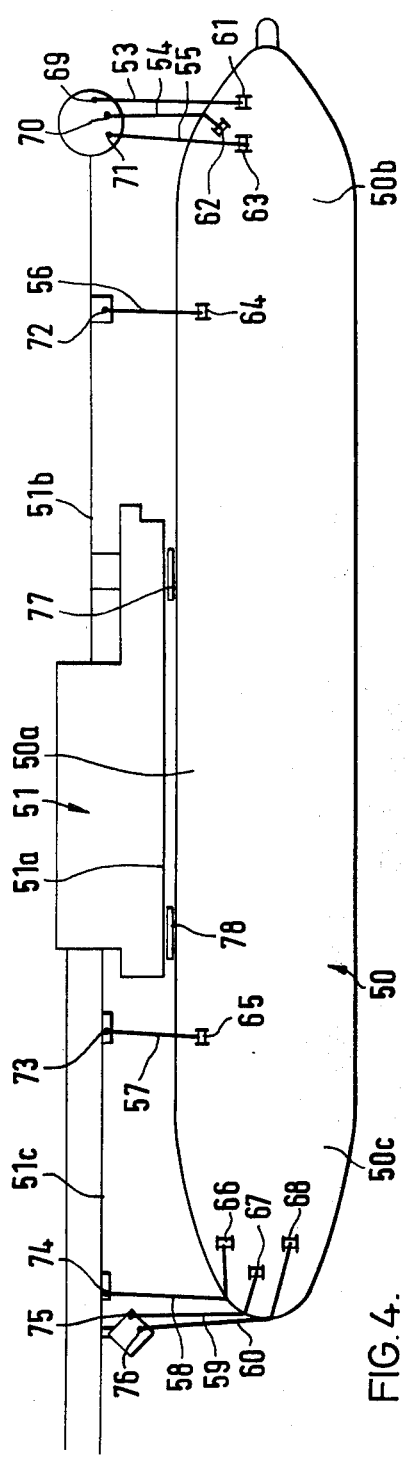
FIG. 4 is a top side view of a ship at a ship terminal, with mooring equipment according to a first embodiment thereof.
Figure 5:
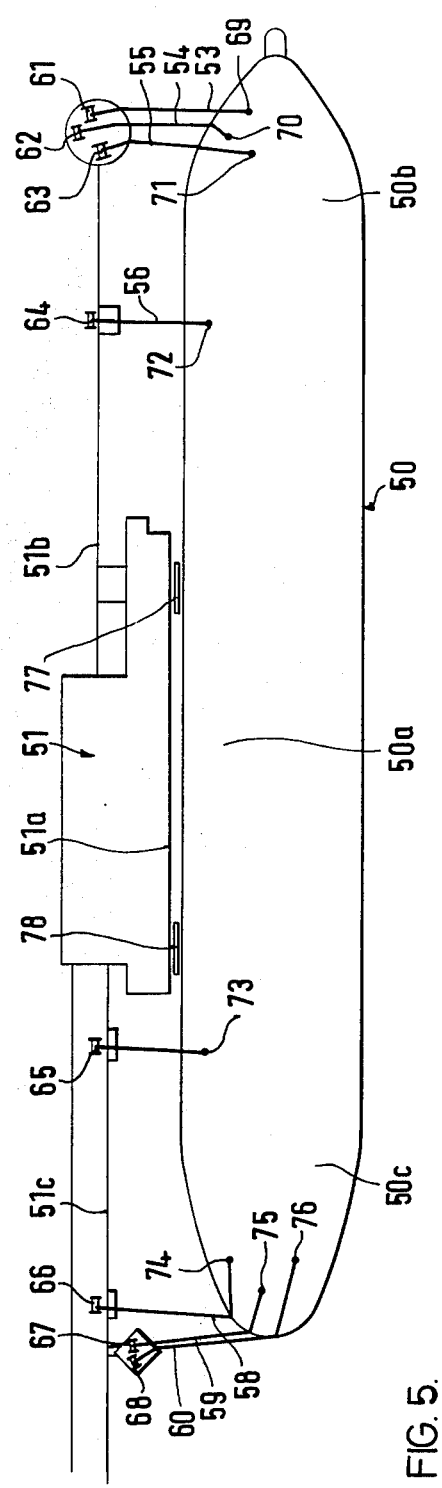
FIG. 5 is a top side view of a ship at a ship terminal, with mooring equipment according to a second embodiment thereof.

In FIGS. 4 and 5 a ship 50 of 200.000 DW tons is illustrated in a mooring position alongside a jetty 51 at a ship terminal. The centre section 50a of the ship is located alongside a pier 51a, whereas opposite end sections 50b and 50c of the ship extend beyond the pier 51a spaced from off-set portions 51b and 51c of the jetty. Eight separate hawsers 53-60 and associated mooring winches 61-68 are being used for mooring the ship in relation to said jetty. In practice any other numbers of hawsers may be used all according to what may be needed in each case.

In the embodiment illustrated in FIG. 4, all mooring winches are located on board the ship, i.e., three winches 61-63 at the stern portion of and one winch 64 and the center portion of the stern end section 50b, one winch 65 at the center portion of and three winches at the aft portion of the aft end section 50c. In the embodiment of FIG. 4 the outer end of each of said hawsers 53-60 is secured to quick release hooks and/or quick release pulleys 69-76 at the off-set jetty portions 51b and 51c.

In the embodiment of FIG. 5 the winches 61-68 are located at the jetty at portions 51b and 51c thereof, whereas the outer end of each hawser is secured to quick release hooks and/or quick release pulleys 69-76 located on board the ship.

In both embodiments two mutually spaced fender constructions 77 and 78 are inserted between the center section 50a of the ship and said pier, and are secured at the pier 51a at opposite ends thereof.

One aim of the present invention is to provide a controlled frictional resistance between the ship's hull and each of said fender constructions. By means of such controlled frictional resistance it is possible to prevent unintentional movements of the ship in relation to the jetty and to regulate the intended movements of the ship in a controlled, safe and secure manner under different wind, stream and tide water conditions and under loading and unloading operations. The frictional resistance is provided by means of the front plate 15 (FIG. 2) of the fender, which is supported at the side surface portion of the ship's hull. Due to tensional forces exerted in the hawsers 53-60 by means of the associated mooring winches 61-68, the ship is being pushed towards the pier 51a via said fender constructions 77, 78. By regulating the tensional forces exerted in the hawsers 53-60 it is possible to regulate the pushing forces of the ship towards said fender constructions and regulate frictional resistance therein accordingly.

It is possible by visual surveillance of the manometer 32 (FIG. 1) of each fender construction 77, 78 to determine the nominal push force exerted by the ship in each fender construction. According to the present invention it will thus be possible to operate the winches by remote control under simultaneous visual surveillance of the manometer 32. This means that it will be possible for the winch operator to regulate the tensional stress in each hawser and accordingly regulate the nominal push force exerted in each fender construction according to what may be required under loading and unloading operations and under shifting wind, stream and/or tide water conditions. In other words the present invention enables the winch operator to stress each hawser only to such an extent as will be required to maintain the desired frictional resistance between each fender construction and the ship's hull.

By simultaneously visually controlling the pressures in the manometers of the fender constructions and visually controlling the tensions exerted in each hawser, as will be evident from the tensiometers at the operating panel of each mooring winch, it will be possible to have a general view of the mooring situation under shifting conditions and to consider and control continuously all external forces involved in the mooring operation of the ship.

In case wind or water stream forces provides local pushing forces towards the ship at one of its ends only, this may have the tendency to move the ship in a tilting movement away from the pier. However, such external forces exerted on the ship will be evident from the manometers of at least one of the fender constructions. By surveillance of the manometers of the fender constructions such tendency can be easily detected before any damage is caused and the tendency of unintended movement of the ship will easily be prevented by regulating the tension in relevant hawsers accordingly. However, in case local pushing forces have a tendency to push the ship unevenly towards the fender constructions at the pier the tensions in the hawsers at one end of the ship can be relieved accordingly to prevent unduly and unintended stress in the relevant fender construction (and in the hawsers).

In case water movements due to tide water variations try to move the ship in vertical direction in respect of the pier and/or the ship has a tendency to be moved in vertical direction in respect of the pier during loading and unloading operations, this will also be evident from the manometers of the fender constructions. To allow such movements of the ship in vertical direction in a controlled manner, the frictional resistance between each fender construction and the ship's hull can be regulated accordingly in controlled manners.

In practice it will be possible for instance under jdangerous or extraordinarily difficult conditions to increase the frictional resistance in one of said fender constructions and simultaneously decrease frictional resistance in the other fender construction, and vice versa in alternating operations. This means that the ship is allowed to be moved with minor local adjustments in vertical direction in respect of the pier at one of said fender constructions, whereas the opposite end of the ship is more or less prevented from such movements at the other fender construction. By shifting the stresses from one fender construction to the other and vice versa, it is thus possible to control other unintended movements of the ship whereas the intended or regulated movements of the ship is allowed to take place under safe control. It is, however, evident that under normal or better conditions the intended movements of the ship can be more easily regulated and this can be done by decreasing the tension in all or most of the hawsers simultaneously and reducing the friction force between the ship and the fender construction to a minimum.

In case external forces are trying to move the ship longitudinally of the pier, this will be evident from the manometer 36 and in case of increasing frictional forces in vertical direction occurring between the ship and fender construction this will be evident from the manometer 40. Simultaneously, the horizontal pushing forces from the ship towards the fender construction will be evident from the manometer 32 and tensions involved in each hawser will be evident from the tensiometer in each mooring winch. Accordingly, each situation in practice may require different actions from what is described above. It is, however, evident that the arrangement process of the invention and the fender constructions according to the present invention enables the winch operator to have a general view of the whole mooring situation and initiate regulations of the hauling tension in each hawser as may be required in each situation.

I claim:

1. In a process of mooring a ship at a ship terminal, using at least two fenders to damp push forces transmitted from the ship to said ship terminal, including hauling the ship towards the ship terminal with a hauling tension provided in a number of hawsers by means of associated mooring winches, the steps of:
   (a) simultaneously exerting a controlled nominal hauling tension in each hawser to provide a nominal minimum push force from the ship towards said ship terminal via said fenders,
   (b) damping said push forces by means of a fluid pressure medium in each fender,
   (c) relieving said pressure medium in said fenders when the pressures thereof exceed predetermined respective pressures,
   (d) determining the pressure of said pressure medium by means of at least three separate measuring means, including a first measuring means indicating the pushing force acting between the ships hull and the jetty, a second measuring means indicating the force acting between the ships hull and the fender longitudinally of the ship and a third measuring means indicating the force acting between the ships hull and the fender vertically of the ship, and
   (e) regulating the hauling tension in each hawser in relation to the pressures indicated in said first, second and third measuring means in order to provide a minimum frictional resistance between the ship's hull and each of said fenders, said minimum resistance being regulated such that a controlled vertical movement of the ship's hull in relation to the fenders is allowed, whereas movement of the ship's hull longitudinally of the ship in relation to the fenders is prevented.

2. A method of mooring a ship to a jetty comprising providing hawsers from the jetty to the ship, all arranged for pulling the ship directly towards the jetty, providing a plurality of fenders on the jetty, developing fluid pressures proportional respectively to the forces applied by the ship viz, (a) applied normal to the longitudinal axis of the ship, (b) applied to the fenders longitudinally of the ship and (c) applied frictionally to the fenders vertically, adjusting the tension in the hawsers in accordance with said pressures such that movement of the ships hull vertically of the fenders is allowed, whereas movement of the ship's hull longitudinally of the ship in relation to the fenders is prevented, providing damping pressure against at least one of said forces and relieving the damping pressure when these exceed predetermined limits.

3. A fender for a ship terminal comprising a front member (15) engageable by the ship, a first hydraulic damping means (16) acting on said member to resist the pressure from the ship normal to the length of the ship, second hydraulic damping means (17, 19) acting on said member to resist movement of the member in both directions lengthwise of the ship, third hydraulic damping means (20, 21) acting on said member to resist movement of the member in both directions vertically, at least three measuring devices (32, 36, 40) connected with said damping means so that one measuring device measures the pushing force between the ship and the fender, the second measuring device measures the force between the ship and the fender longitudinally of the ship, and the third measuring device measures the force between the ship and the fender vertically of the ship.

4. A fender as claimed in claim 3, wherein the measuring devices are manometers.

5. A fender as claimed in claim 3, having excess pressure non-return relief valves connected with the hydraulic damping means.

6. A fender as claimed in claim 3, wherein the first hydraulic damping means is associated with a first relief valve, and the second hydraulic damping means is associated with a second relief valve (42) and with a non-return valve (41) through which said second damping means can draw liquid, said second damping means being in the form of cylinders and pistons arranged for movement towards the ship terminal from a normal position to a dead centre position during which the pistons move into the cylinders and press liquid through said second relief valve and for further movement toward the ship terminal during which the pistons are drawn in the direction out of the cylinders and draw liquid through said non-return valve.

* * * * *